United States Patent Office 3,313,924
Patented Apr. 11, 1967

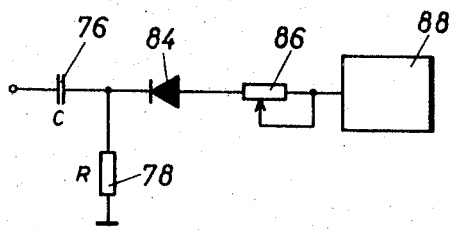
FIG.4
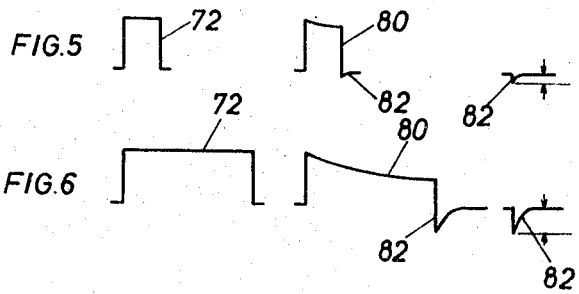
FIG.5
FIG.6
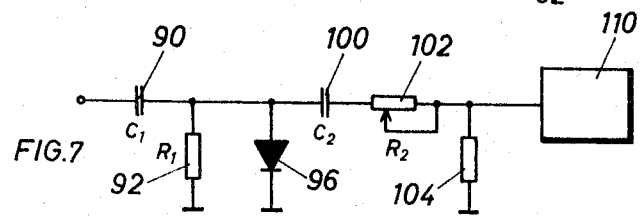
FIG.7
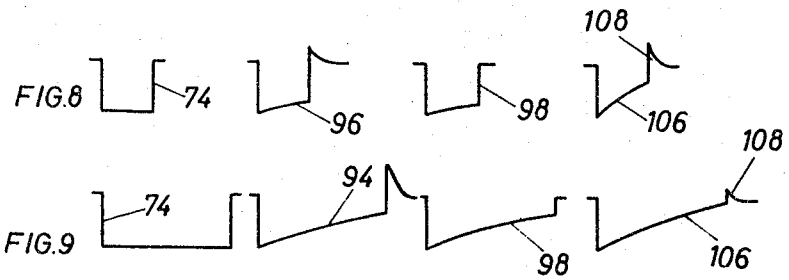
FIG.8
FIG.9
WOLFGANG SCHULZ
GERHARD SIESS
HARRY VINCENT CARTER
*INVENTORS.*

3,313,924
INTEGRATOR INCLUDING MEANS FOR CONTROLLING AN OUTPUT COUNTER AND THE INPUT SIGNAL MAGNITUDE
Wolfgang Schulz, Uberlingen (Bodensee), and Gerhard Siess, Owingen, Kreis Uberlingen, Germany, and Harry V. Carter, Beaconsfield, England, assignors to Bodenseewerk Perkin-Elmer & Co. G.m.b.H., Uberlingen (Bodensee), Germany
Filed June 7, 1963, Ser. No. 286,359
Claims priority, application Germany, June 8, 1962, B 67,615
8 Claims. (Cl. 235—150.51)

GENERAL

The present invention relates to an electronic integrator and in particular to that type of an integrator wherein the signal being integrated is converted into a series of impulses having a frequency proportional to the amplitude of the signal being integrated and the impulses are, in turn, counted by a suitable counting mechanism.

It is well known that a varying function, available in the form of an electrical signal, may be integrated by converting the electrical signal into a series of electrical impulses having a frequency proportional to the amplitude of the electrical signal and then counting the number of electrical impulses. The counting mechanism may then provide a digital indication of the time integral of the input electrical signal. The apparatus which converts the input electrical signal into the series of electrical impulses is commonly known as a voltage to frequency transducer. It is important that a truly linear relationship exist between the amplitude of the input electrical signal and the frequency of the electrical impulses developed by the voltage to frequency transducer. If this relationship is non-linear, distortions are created and the final count of the impulses is not truly representative of the integral of the signal being integrated. Conventional voltage to frequency transducers have only a limited range over which the frequency of the impulses developed by the transducer is linearly related to the amplitude of the signal being integrated. When the frequency of the impulses is very high, certain factors which may otherwise be neglected become important and noticeable and thereby disturb the otherwise linear relationship. By way of example, a voltage to frequency transducer described and claimed in the copending application of Gerhard Siess, Ser. No. 284,057, filed May 29, 1963 is composed of a Miller integrator having a glow lamp connected in parallel with the feedback capacitor of the Miller integrator. When an input signal is applied to the Miller integrator, a linearly varying voltage is developed across the feedback capacitor. The rate of rise of this voltage is dependent upon the amplitude of the input signal. When the voltage across the capacitor reaches the firing potential of the glow lamp, the glow lamp discharges the capacitor to a level equal to the cutoff potential of the glow lamp. Now the capacitor is free to again charge to a level equal to the firing potential of the glow lamp. This operation is repeated so that a repetitive sawtooth signal is developed having a frequency proportional to the amplitude of the input signal. This proportionality exists over extremely wide limits. However, at very high frequencies the time required to discharge the feedback capacitor through the glow lamp can not be neglected and, therefore, non-linearities do occur which may distort the measured result. Similar problems occur with other voltage to frequency transducers.

It is therefore an object of the present invention to provide a new and improved electronic integrator.

It is another object of the present invention to provide an integrator of the type previously considered wherein the operation of the integrator is confined to the linear range of the voltage to frequency tranducer.

It is a further object of the present invention to provide an integrator not subject to the shortcomings and limitations inherent in presently known integrators.

An integrator, constructed in accordance with the present invention, comprises a voltage to frequency transducer having a limited range over which the frequency of the impulses developed by the transducer is linearly related to the amplitude of a signal supplied thereto and means for supplying an input signal to the voltage to frequency transducer. This integrator also includes a counter for counting the impulses developed by the voltage to frequency transducer and sensing means for monitoring the level at which the voltage to frequency transducer is operating and for developing a control effect when a preselected level on the aforesaid limited range is exceeded. This integrator additionally includes means responsive to the control effect developed by the sensing means for attenuating the input signal supplied to the voltage to frequency transducer by a prescribed factor when the preselected level is exceeded and for translating the attenuated signal to the transducer. This integrator further includes means responsive to the control effect developed by the sensing means for increasing the counting rate of the counter by the same prescribed factor by which the input signal is attenuated when the preselected level is exceeded.

For a better understanding of the present invention, together with other and further objects thereof, reference is had to the following description, taken in connection with the accompanying drawings, and its scope will be pointed out in the appended claims.

Referring to the drawings:

FIGURE 4 is a circuit diagram showing the details of a portion of the FIGURE 1 integrator;

FIGURES 5 and 6 illustrate wave forms which are useful in explaining the operation of the present invention;

FIGURE 7 is a circuit diagram showing the details of a portion of the FIGURE 1 integrator; and FIGURES 8 and 9 illustrate wave forms which are useful in explaining the operation of the present invention.

DESCRIPTION AND OPERATION OF THE INTEGRATOR

Figure 1:
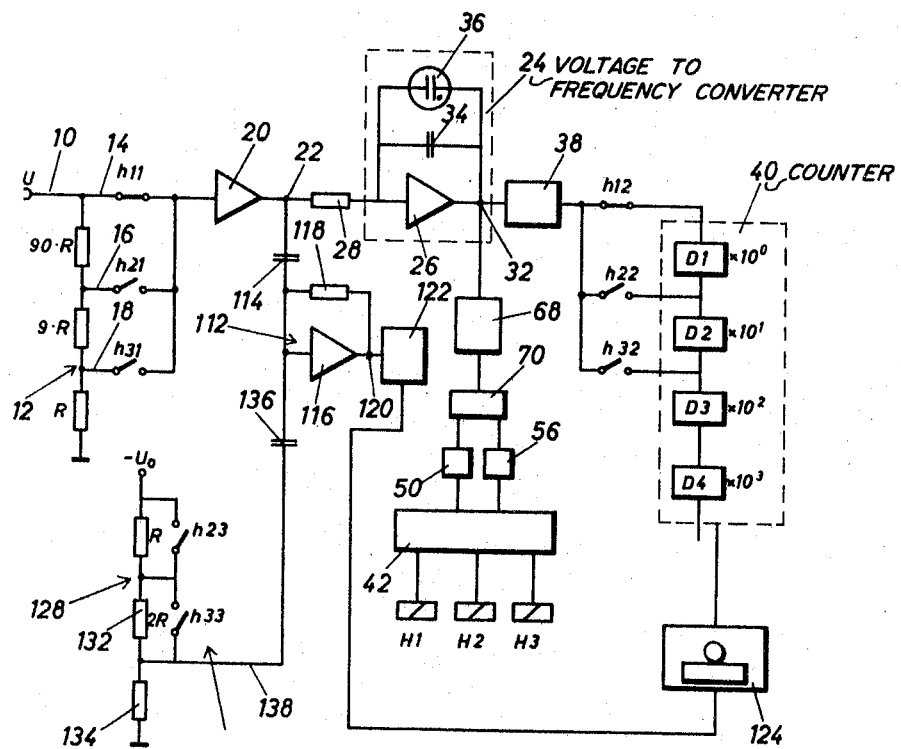
FIGURE 1 is a block diagram of an integrator constructed in accordance with the present invention.

Referring to FIGURE 1, an input signal U which is to be integrated is applied to an input terminal 10. A voltage divider 12 is connected to the input terminal 10. This voltage divider may be composed of three fixed resistors, the resistance values of which are, for the embodiment shown, in the proportion 90:9:1. The tapping points 14, 16 and 18 of the three fixed resistors and at which voltages U, 0.1U and 0.01U are available, are connected to the input of a direct current amplifier 20 through relay contacts $h_{11}$, $h_{21}$ and $h_{31}$. In a manner to be described hereinafter, one of the relay contacts $h_{11}$, $h_{21}$ and $h_{31}$ is closed while the other two are open. Relay contacts $h_{11}$, $h_{21}$ and $h_{31}$ are controlled by relays $H_1$, $H_2$ and $H_3$, respectively.

The output of the amplifier 20 is applied to the input 22 of a voltage to frequency transducer 24. The voltage to frequency transducer 24 includes a high gain amplifier 26 and a serially connected resistor 28 connected between the input terminal 22 and the input 30 to the amplifier 26. The voltage to frequency transducer also includes a capacitor 34 connected between the output 32 of the amplifier 26 and the input 30 of the amplifier 26. The portion of the voltage to frequency transducer 24 so far described corresponds to a conventional Miller integrator. When a constant input signal is applied at the input terminal 22 of the voltage to frequency transducer 24, the output voltage at output 32 at first increases linearly. Because the amplifier 26 has a very high gain, the same voltage exists across the feedback capacitor 34.

The voltage to frequency transducer 24 also includes a glow lamp 36 connected in parallel with the capacitor 34. When the output voltage of the amplifier 26 reaches a level equal to the firing potential of the glow lamp 36, the glow lamp fires and rather abruptly discharges the capacitor 34 down to the cut-off potential of the glow lamp at which time the glow lamp is turned off and the output voltage is again permitted to linearly rise up to the firing potential of the glow lamp. This operation is repeated so that a repetitive sawtooth signal is developed having a frequency proportional to the amplitude of the input signal over a relatively wide range. The factor which limits the range of linearity is the requirement that the discharge time of the capacitor 34 be small relative to the period during which the capacitor is charged. If the discharge time becomes appreciable, a non-linearity may result. This non-linearity is prevented, according to the present invention, by attenuating the input signal by a prescribed factor and coupling the attenuated signal to the voltage to frequency transducer 24 through a different one of the relay contacts $h_{11}$, $h_{21}$ and $h_{31}$ so that the voltage to frequency transducer is always operated in its linear range.

The output impulses developed by the voltage to frequency transducer 24 are fed to a counting device 40 which is seen to have four decades D1, D2, D3 and D4. In particular, these output impulses are coupled through an impulse former 38, if such a circuit is needed, and relay contacts $h_{12}$, $h_{22}$ and $h_{32}$. Decade D1 counts units digits, decade D2 counts tenths digits, decade D3 counts hundredths digits, and D4 counts thousandths digits. Relay contacts $h_{12}$, $h_{22}$ and $h_{32}$ are controlled by relays $H_1$, $H_2$ and $H_3$, respectively.

If relay contacts $h_{11}$ and $h_{12}$ are closed, the input signal, without attenuation, is applied to the input terminal 22 of the voltage to frequency transducer 24. The output impulses of the voltage to frequency transducer 24 are applied to the first decade D1 of the counting device 40 through relay contacts $h_{12}$. With an increase of the input signal U beyond a preselected level of operation of the voltage to frequency transducer 24, relay contacts $h_{11}$ and $h_{12}$ open and relay contacts $h_{21}$ and $h_{22}$ close. Now, only 0.1U is applied to the direct current amplifier 20. This causes a corresponding decrease in the impulse frequency of the voltage to frequency transducer 24. However, by opening relay contact $h_{12}$ and closing relay contact $h_{22}$, the impulses from the voltage to frequency transducer 24 are fed to the tenths digit decade D2 of the counter 40 so that each impulse is counted ten times. Thus, for an attenuation of the input signal U by a factor of ten, there is a corresponding increase in the counting rate by a factor of ten. This action is effective to confine the operation of the voltage to frequency transducer 24 below any preselected level. The input signal U may now increase further without exceeding the range of linearity of the voltage to frequency transducer 24 or overdriving the direct current amplifier 20 since only one-tenth of the actual input signal becomes effective at the amplifier and the transducer. There is no error in the indication of the counter 40 because of this attenuation since compensation is provided by directing the impulses from the voltage to frequency transducer 24 to a different decade. The same results are achieved for further increases in the amplitude of the input signal U. Relay contacts $h_{21}$ and $h_{22}$ open and relay contacts $h_{31}$ and $h_{32}$ close so that only one-hundredth of the input signal U is applied to the direct current amplifier 20. However, the impulses from the voltage to frequency transducer 24 are now fed to the hundredths decade D3 of the counter 40 through relay contact $h_{32}$. Thus, the integrator, constructed according to the present invention, has a very wide range over which a linear relationship exists between the amplitude of the input signal and the frequency of the impulses developed by the voltage to frequency transducer.

Figure 2:
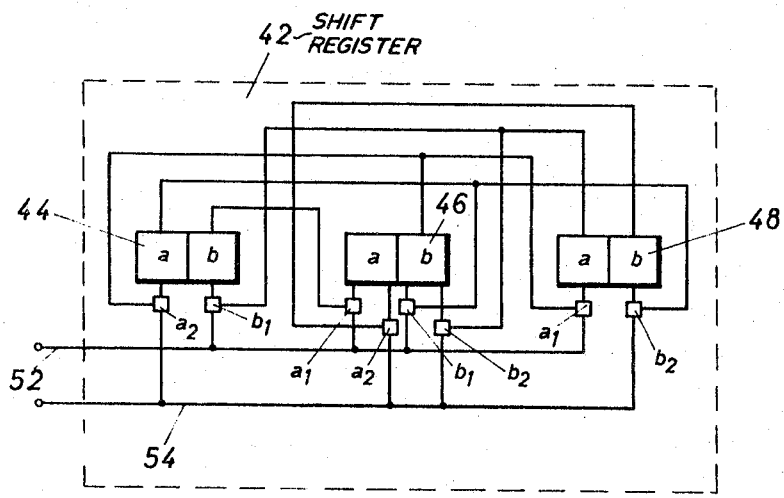
FIGURE 2 is a block diagram of a shift register used in the FIGURE 1 integrator.

Relays $H_1$, $H_2$ and $H_3$ are controlled by a shift register 42. Referring to FIGURE 2, shift register 42 is composed of three flip-flops 44, 46 and 48. At any particular time one of the flip-flops is in condition "1" and causes its associated relay $H_1$, $H_2$ or $H_3$ to be operative, while the other two flip-flops are in condition "0" and cause their associated relays to be inoperative. For the conditions illustrated in FIGURE 1 with relay contacts $h_{11}$ and $h_{12}$ closed, the shift register 42 is in condition "100." An upper limit circuit 50, shown in FIGURE 1, senses when the frequency of the impulses developed by the voltage to frequency transducer 24 corresponds to a preselected level of operation of the transducer. While this preselected level will, in most cases, correspond to the upper limit of the range over which the impulse frequency is linearly related to the amplitude of the input signal, there is no requirement that this be so; any level may be chosen. When this preselected level or upper limit is sensed, the upper limit circuit 50 develops a signal which is fed through a forward connection 52 of the shift register 42 and condition "1" is shifted from flip-flop 44 to flip-flop 46. When the upper limit is again sensed, condition "1" is shifted from flip-flop 46 to flip-flop 48. A lower limit circuit 56, shown in FIGURE 1, senses when the impulse frequency of the voltage to frequency transducer 24 reaches a lower limit and this circuit develops a signal which is fed through a backward connection 54 of the shift register 42 and is effective to shift condition "1" from flip-flop 48 to flip-flop 46 or from flip-flop 46 to flip-flop 44 depending on the point of operation of the transducer. With the shifting of condition "1," the relays $H_1$, $H_2$ and $H_3$ are synchronously affected so as to open or close relay contacts $h_{11}$, $h_{12}$, $h_{21}$, $h_{22}$, $h_{31}$ and $h_{32}$.

Referring again to FIGURE 2, each of the flip-flops 44, 46 and 48 is composed to two transistors $a$ and $b$. For condition "0," transistor $b$ is nonconductive and transistor $a$ is conductive. For condition "100" of the shift register 42, transistor $a$ of flip-flop 42 is nonconductive and transistor $b$ is conductive. Each basic input of each of the flip-flops 44, 46 and 48 is connected with the forward connection 52 as well as with the backward connection 54 through one of the diode gates $a_1$, $a_2$, $b_1$, $b_2$. Connection with the forward connection 52 is established through diode gates $a_1$ and $b_1$ while connection with the backward connection 54 is established through diode gates $a_2$ and $b_2$. Each diode gate is controlled by the potential at a collector electrode of an adjacent stage. In particular, the collector electrode potential of transistor $a$ of each stage controls the diode gate $b_1$ connected between the forward connection 52 and transistor $b$ of the following stage while the collector electrode potential of transistor $b$ of each stage controls diode gate $a_1$ connected between the forward connection 52 and transistor $a$ of the following stage. The collector electrode potential of transistor $a$ of each stage controls diode gate $b_2$ connected between the backward connection 54 and transistor $b$ of the preceding stage while the collector electrode potential of transistor $b$ of each stage controls diode gate $a_2$ connected between the backward connection 54 and transistor $a$ of the preceding stage. With the shift register of the type described herein comprising only three flip-flops some diode gates and control connections may be omitted since the information from flip-flop 44 can only be shifted forward and that from the flip-flop 48 can only be shifted backward. Consequently, the diode gates $a_1$ and $b_2$ are omitted for flip-flop 44 and diode gates $a_2$ and $b_1$ may also be omitted for flip-flop 48.

The operation of the shift register may be most readily understood by means of an example. Assume that the shift register 42 is in condition "100," that is to say transistor $a$ of flip-flop 44 is nonconductive, transistor $b$ of flip-flop 44 is conductive, while in flip-flops 46 and 48 transistors $a$ are conductive and transistors $b$ are nonconductive. Under these conditions:

In stage 44: gate $b_1$ is open due to transistor $a$ of flip-flop 48.

In stage 46: gate $a_1$ is open due to transistor $b$ of flip-flop 44; gate $b_1$ is blocked due to transistor $a$ of flip-flop 44.

In stage 48: gate $a_1$ is clocked due to transistor $b$ of flip-flop 46.

If a switching impulse is applied to the forward connection 52, the following happens:

In stage 44: the impulse passes through gate $b_1$ to transistor $b$ and reverses the flip-flop. Transistor $a$ is now conductive and transistor $b$ is nonconductive.

In stage 46: the impulse passes through gate $a_1$ to transistor $a$ and reverses the flip-flop. Transistor $a$ is now non-conductive and transistor $b$ is conductive.

In stage 48: no changes occur since gate $a_1$ is blocked.

The shift register has now changed to condition "010." In this condition the gates behave as follows:

In stage 44: gate $b_1$ is open due to transistor $a$ of flip-flop 48.

In stage 46: gate $a_1$ is blocked due to transistor $b$ of flip-flop 44; gate $b_1$ is open due to transistor $a$ of flip-flop 44.

In stage 48: gate $a_1$ is open due to transistor $b$ of flip-flop 46.

If a switching impulse is applied to the forward connection 52 the following happens:

In stage 44: the impulse passes through gate $b_1$ to the already nonconductive transistor $b$. Therefore, no reversal is effected.

In stage 46: the impulse passes through gate $b_1$ to transistor $b$ and reverses the flip-flop. Transistor $b$ is now nonconductive and transistor $a$ is conductive.

In stage 48: the impulse passes through gate $a_1$ to transistor $a$ and reverses the flip-flop. Transistor $a$ is now nonconductive and transistor $b$ is conductive.

By action of the second forward impulse the shift register is now in condition "001."

Returning to the intermediate condition "010" of shift register 42, under these conditions:

In stage 44: gate $a_2$ is open due to transistor $b$ of flip-flop 46.

In stage 46: gate $a_2$ is blocked due to transistor $b$ of flip-flop 48; gate $b_2$ is open due to transistor $a$ of flip-flop 48.

In stage 48: gate $b_2$ is open due to transistor $a$ of flip-flop 44.

If a switching impulse is applied to the backward connection 54 the following happens:

In stage 44: the impulse passes through gate $a_2$ to transistor $a$ and reverses the flip-flop. Transistor $a$ is now nonconductive and transistor $b$ is conductive.

In stage 46: the impulse passes through gate $b_2$ to transistor $b$ and reverses the flip-flop. Transistor $b$ is now nonconductive and transistor $a$ is conductive.

In stage 48: the impulse passes through gate $b_2$ to transistor $b$. This transistor, however, is already nonconductive so there is no change in flip-flop 48.

Through the action of the impulse to the backward connection 54, the shift register 42 changes from condition "010" to the starting condition "100." Condition "1" is shifted to the right from stage to stage for each impulse applied to the forward connection 52 and to the left from stage to stage for each impulse applied to the backward connection 54. The three relays $H_1$, $H_2$ and $H_3$ are so controlled by the flip-flops 44, 46 and 48 that the respective relays are operative when the associated flip-flop is in condition "1" and inoperative when the associated flip-flop is in condition "0."

Figure 3:
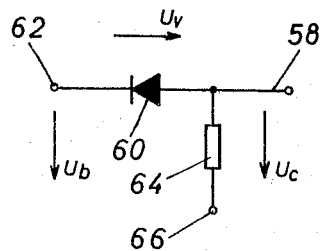
FIGURE 3 is a circuit diagram of a diode gate which is part of the FIGURE 2 shift register.

FIGURE 3 is a circuit diagram of the diode gate used in the shift register of FIGURE 2. The input impulse which is applied to the forward connection 52 or the backward connection 54 is coupled to the base 62 of the particular transistor $a$ or $b$ of the particular flip-flop through a diode 60. One side of the diode 60, the plate side for the arrangement shown, is coupled to the collector of the controlling transistor so that the collector potential of this transistor is applied at terminal 66 through a resistor 64. By way of example, the negative collector potential of transistor $b$ of stage 44 is applied to terminal 66 of diode gate $a_1$ of stage 46 while the other side of the diode 62 is connected to the base electrode of transistor $a$ of stage 46. The input terminal 58 of this diode gate is connected to the forward connection 52. Therefore, a diode bias potential is applied to the diode 60:

$$U_v = U_b - U_c$$

If this difference in potential of $U_b$ and $U_c$ is positive the diode is blocked.

The impulses applied to the forward and backward connections 52 and 54, respectively, are supplied by the upper limit circuit 50 and the lower limit circuit 56. These two circuits are frequency sensitive. The operation of these circuits will be most readily understood by reference to FIGURES 1 and 4 through 9. The output impulses from the voltage to frequency transducer 24 are supplied to a flip-flop 70 through an impulse forming circuit 68. The flip-flop 70 supplies a rectangular signal 72 or 74 shown in FIGURES 5, 6, 8 and 9 of half the frequency of the signals from the voltage to frequency transducer 24. The duration of the half-wave of the signals 72 and 74 is greater for lower frequencies and smaller for higher frequencies. FIGURES 5 and 8 are intended to represent relatively higher frequencies while FIGURES 6 and 9 are intended to represent relatively low frequencies. For high frequencies, upper limit circuit 50 will supply a signal while for low frequencies, lower limit circuit 56 will supply a signal.

The lower limit circuit 56 to which rectangular signals 72 are applied is shown in detail in FIGURE 4. It is composed of an RC differentiating circuit having a condenser 76 and a resistor 78. When a rectangular signal 72 is supplied to the differentiating circuit it produces a signal such as the one represented by wave form 80 in FIGURES 5 and 6. The leading edge of signal 72 is passed by condenser 76. Then, condenser 76 charges exponentially so that the voltage across resistor 78 drops exponentially. The trailing edge of signal 72 is passed by condenser 76. The duration of signal 72 determines the amount that condenser 76 is charged and the amount of overshoot after the occurrence of the trailing edge of signal 72. For short durations of signal 72, condenser 76 is charged to a low level and only minor overshoots are developed as illustrated in wave form 80 of FIGURE 5. If, however, the rectangular signal 72 has a greater duration, corresponding to a lower frequency of impulses from the voltage to frequency transducer 24, the conditions are those represented in FIGURE 6. Here too, the leading edge of the rectangular signal 72 is passed by the condenser 76. Now, however, condenser 76 is charged a great deal more, so that at the time of the occurrence of the trailing edge of the rectangular signal 72 the condenser voltage is greater. Now the overshoot of wave form 80 is a great deal larger than the overshoot shown in FIGURE 5. A diode 84, shown in FIGURE 4, removes the positive portions of wave form 80 so that only the negative overshoots remain. These overshoots are fed to a Schmitt trigger circuit 88 through an adjusting resistor 86 which is provided as a sensitivity adjustment. The Schmitt trigger circuit supplies a backward impulse to the backward connection 54 of the shift register 42. The circuits are so arranged that small negative overshoots are not sufficient to trigger the Schmitt trigger circuit 88. In other words, if the duration of the rectangular signal 72 exceeds a certain value, that is to say, the frequency of impulses from the voltage to frequency transducer 24 falls below the lower limit value, the negative overshoots are sufficient to pass a critical value and energize the Schmitt trigger circuit.

When the lower limit value of the signal frequency is reached, the shift register is reversed from condition "001" to condition "010" or from condition "010" to condition "100." Accordingly, there is a change in which one of the relays $H_1$, $H_2$ or $H_3$ becomes operative. For example, relay contact $h_{31}$ may be opened and relay contact $h_{21}$ closed so that the input signal to the voltage to frequency transducer 24 is increased by a factor of ten as well as the frequency of the impulses developed by the voltage to frequency transducer. Through this action, the lower limit circuit 56 again receives signals of the type shown in FIGURE 5 which are not able to trigger the Schmitt trigger circuit 88.

The upper limit circuit 50 is shown in detail in FIGURE 7. It also includes an RC differentiating circuit having a condenser 90 and a resistor 92. This differentiating circuit, functioning in a manner similar to the one shown in FIGURE 4 transforms the rectangular signals 74 in FIGURES 8 and 9 into wave forms 94 with the amount of exponential variation being dependent upon the length or duration of the rectangular signals 74. Again the amount of the overshoots is dependent upon the duration of the rectangular signals 74. A diode 96, shown in FIGURE 7, is effective to remove the overshoots so that signals such as those represented by wave forms 98 are developed. Wave forms 98 are seen to have a steep leading edge followed by an exponential decay. The trailing edges of wave forms 98 are longer or shorter depending upon the durations of the rectangular signals 74. The signals represented by wave forms 98 are fed to a second differentiating circuit composed of a condenser 100, an adjusting resistor 102 and a fixed resistor 104. This second differentiating circuit develops signals such as the ones represented by wave forms 106. The leading edge of wave forms 98 is passed by condenser 100. The condenser 100, however, charged relatively quickly through resistor 104 so that wave forms 106 decay towards zero. It is seen that wave forms 106 decay more rapidly than do wave forms 98, so that the output signal of the second differentiating circuit is almost equal to zero at the occurrence of the trailing edge of wave forms 98. The trailing edge is passed by condenser 100 and the condenser voltage again decays exponentially toward zero. The amount of the overshoots 108 is dependent upon the amount of the overshoots of wave forms 94 cut off by diode 96. Therefore, the amount of the overshoots 108 of wave forms 106 is dependent upon the frequency of the rectangular signal 74 and consequently dependent upon the frequency of the impulses from the voltage to frequency transducer 24. Overshoots 108 control a Schmitt trigger circuit 110 which responds to those overshoots which have reached a certain level and consequently represent reaching a frequency of the impulses of the voltage to frequency transducer which is beyond the upper limit value. The Schmitt trigger circuit 110 supplies a forward impulse to the forward connection 52 of the shift register 42. In this way, the input signal to the voltage to frequency transducer 24 is reduced by a factor of 10 by the action of relays $H_1$, $H_2$ and $H_3$ so that a condition is created corresponding to FIGURE 9 wherein the overshoot 108 is not sufficient to trigger the Schmitt trigger circuit 110. Thus, the upper limit circuit 50 and the lower limit circuit 56 are two frequency sensitive circuits which supply output impulses when the impulse frequency of the voltage to frequency transducer reaches an upper or lower limit value. The output impulses developed by circuits 50 and 56 are, in turn, used to control the further operation of the shift register 42 which, in turn, controls the attenuating means and the means for increasing or decreasing the counting rate of a counting device 40.

An integrator, such as the one just described, is particularly suited for the analysis of mixtures by means of gas chromatography techniques. It will be obvious, however, that its application is not limited solely to gas chromatography apparatus, but that the integrator may be used in a number of other areas. As is well known, a gas chromatograph comprises a separating column filled or covered with a suitable separating substance and having a carrier gas flow maintained therethrough. A measured volume of a gas or vapor mixture which is to be analyzed is inserted into the carrier gas flow by means of a sample pick-up at the entrance of the separating column by the carrier gas flow. The components of the mixture travel through the column and elute at different times, which are dependent upon the degree of interaction or affinity between the components and the separating substance. A detector, arranged at the exit of the separating column, develops a signal which varies in accordance with the concentration of the mixture components. This detector signal may be recorded by means of a recording device and a chromatogram is thus attained. In the case of a complete separation of the components, the chromatogram is a series of bell shaped curved peaks, each curve corresponding to a separate mixture component which appears at the exit of the separating column. In the case of incomplete separation these curves may run together. The total concentration of a single component is proportional to the area of its curve or to the time integral of the detector signal. Therefore, the detector signal may be applied to the input of an integrator such as the one constructed according to the present invention so as to develop an immediate digital indication of the area of each curve and thus an indication of the concentration of the mixture components.

It is important, however, that each peak be separately integrated. For this reason, extreme value sensers are provided so as to detect the occurrence of a peak or valley, the valleys indicating the commencement or completion of a curve and the peaks indicating the maximum amplitudes of the chromatogram. Accordingly, the integrator constructed in accordance with the present invention may include an extreme value senser composed of a differentiating circuit 112 connected to the input of the voltage to frequency transducer at input terminal 22. The differentiating circuit 112 may comprise a condenser 114 connected between input terminal 22 and the input to a high gain amplifier 116. The output of the amplifier 116 is fed back to its input through a resistor 118. The differential signal developed by the differentiating circuit 112 passes through zero when ever the signal from which it has been developed passes through a peak or valley. The times at which the differential signal passes through zero and the sense of direction, whether positive to negative or negative to positive, may be detected by a conventional bi-stable circuit 122 and used to control a circuit within the counting device 40 so as to start and stop the counter.

Because of the action of relays $H_1$, $H_2$ and $H_3$ and the respective relay contacts $h_{11}$, $h_{21}$, and $h_{31}$, the signal at the input to the voltage to frequency transducer 24 jumps and these jumps are sensed as maxima or minima by the extreme value senser. By way of example, with a continuously increasing signal at input terminal 10, relay contact $h_{11}$ is opened and relay contact $h_{21}$ is closed when the amplitude of the input signal exceeds a particular value. At this point the input to the voltage to frequency transducer 24 decreases by a factor of 10. The extreme value senser, may, in this way, detect the occurrence of a peak when, in fact, the input signal at input terminal 10 is still increasing. A similar problem exists when the input signal at input terminal decreases and the relay contacts switch. In order to avoid this effect blocking means 126 are provided which are controlled by the action of relays $H_2$ and $H_3$. These blocking means may include a voltage divider 128 across which a negative voltage $-U$ is applied. The voltage divider is composed of three resistors 130, 132 and 134 having a resistance ratio 1:2:1. Resistor 130 is bridged by relay contact $h_{23}$ of relay $H_2$ while resistor 132 is bridged by the relay contact $h_{33}$ of relay $H_3$. A voltage is developed between resistors 132 and 134 which is supplied to the input of amplifier 116 through a differentiating condenser 136. Ordinarily, this voltage has no influence on the output of the differentiating circuit 112 since a constant voltage is eliminated in the differentiation. If, however, an attenuation of the input signal is effected, a jump in voltage occurs simultaneously at condenser 136 which, when differentiated becomes noticeable as a sharp impulse at the output 120 of the differentiating circuit 112. This sharp impulse compensates for the impulse produced by the differentiation of the change in the input signal due to attenuation so as to prevent circuit 122 from providing an improper indication of the occurrence of a peak or valley. For the particular resistance ratios mentioned above for resistors 130, 132 and 134, the voltages which exist across the tapping point 138 of the voltage divider 128 are:

With relay $H_1$ operative ($h_{23}$ and $h_{33}$ open)——$U/4$.
With relay $H_2$ operative ($h_{33}$ open)——$U/3$.
With relay $H_3$ operative ($h_{23}$ open)——$U/2$.

Thus, as the input signal is varied, voltage jumps of $U/12$ and $U/6$ occur.

While there has been described what is at present considered to be the preferred embodiment of this invention, it will be obvious to those skilled in the art that various changes and modifications may be made therein without departing from the invention, and it therefore aimed to cover all such changes and modifications as fall within the true spirit and scope of the invention.

What is claimed is:

1. An integrator comprising:
a voltage to frequency transducer having a limited range over which the frequency of the impulses developed by said transducer is linearly related to the amplitude of a signal supplied thereto;
means for supplying an input signal to said voltage to frequency transducer;
a counter for counting the impulses developed by said voltage to frequency transducer;
sensing means for monitoring the level at which said voltage to frequency transducer is operating and for developing a control effect when a preselected level on said limited range is exceeded;
means responsive to said control effect for attenuating said input signal by a prescribed factor when said preselected level is exceeded and for translating said attenuated signal to said voltage to frequency transducer;
and means responsive to said control effect for increasing the counting rate of said counter by the same prescribed factor by which said input signal is attenuated when said preselected level is exceeded.

2. An integrator according to claim 1 wherein said means for attenuating said input signal by a prescribed factor and means for increasing the counting rate by the prescribed factor each comprises means for attenuating and increasing the counting rate by a decimal power.

3. An integrator comprising:
a voltage to frequency transducer having a limited range over which the frequency of the impulses developed by said transducer is linearly related to the amplitude of a signal supplied thereto;
means for supplying an input signal to said voltage to frequency transducer;
a counter for counting the impulses developed by said voltage to frequency transducer;
frequency sensitive means for monitoring the output frequency of said voltage to frequency transducer and for developing a control effect when a preselected frequency on said limited range is exceeded;
means responsive to said control effect for attenuating said input signal by a prescribed factor when said preselected frequency is exceeded and for translating said attenuated signal to said voltage to frequency transducer;
and means responsive to said control effect for increasing the counting rate of said counter by the same prescribed factor by which said input signal is attenuated when said preselected frequency is exceeded.

4. An integrator comprising:
a voltage to frequency transducer having a limited range over which the frequency of the impulses developed by said transducer is linearly related to the amplitude of a signal supplied thereto;
means for supplying an input signal to said voltage to frequency transducer;
a decimal counter having a plurality of decade stages for counting the impulses developed by said voltage to frequency transducer;
sensing means for monitoring the output frequency of said voltage to frequency transducer and for developing a control effect when a preselected frequency on said limited range is exceeded;
means responsive to said control effect for attenuating said input signal by a decimal power when said preselected level is exceeded and for translating said attenuated signal to said voltage to frequency transducer;
and means responsive to said control effect for coupling said impulses developed by said voltage to frequency transducer to that decade stage which counts by the same decimal power by which the input signal is attenuated when said preselected level is exceeded.

5. An integrator comprising:
a voltage to frequency transducer having a limited range over which the frequency of the impulses developed by said transducer is linearly related to the amplitude of a signal supplied thereto;
means for supplying an input signal to said voltage to frequency transducer;
a counter for counting the impulses developed by said voltage to frequency transducer;
means responsive to said impulses developed by said voltage to frequency transducer for developing a second signal having a duration which varies inversely with the frequency of said impulses;
means responsive to said second signal for developing a third signal having amplitude characteristics which vary inversely with the duration of said second signal;
amplitude sensing means responsive to said third signal for developing a control effect when said amplitude characteristics exceed a preselected magnitude;
means responsive to said control effect for attenuating said input signal by a prescribed factor when said preselected amplitude magnitude is exceeded and for translating said attenuated signal to said voltage to frequency transducer;
and means responsive to said control effect for increasing the counting rate of said counter by the same prescribed factor by which said input signal is attenuated when said preselected level is exceeded.

6. An integrator comprising:
a voltage to frequency transducer having a limited range over which the frequency of the impulses developed by said transducer is linearly related to the amplitude of a signal supplied thereto;

means for supplying an input signal to said voltage to frequency transducer;

a counter for counting the impulses developed by said voltage to frequency transducer;

means responsive to said impulses developed by said voltage to frequency transducer for developing a rectangular signal having a duration which varies inversely with the frequency of said impulses;

a first differentiating circuit responsive to said rectangular signal for differentiating said rectangular signal and thereby developing a first overshoot from the trailing edge of said rectangular signal, the amplitude of said first overshoot varying directly with the duration of said rectangular signal;

clipping means for removing said first overshoot;

a second differentiating circuit, having a fast time constant, responsive to the output signal of said clipping means for differentiating said output signal and thereby developing a second overshoot from the trailing edge of said output signal, the amplitude of said second overshoot varying directly with the amplitude of said trailing edge of said output signal;

means responsive to said second overshoot for developing a control effect when the amplitude of said second overshoot exceeds a preselected magnitude;

means responsive to said control effect for attenuating said input signal by a prescribed factor when said preselected amplitude magnitude is exceeded and for translating said attenuated signal to said voltage to frequency transducer;

and means responsive to said control effect for increasing the counting rate of said counter by the same prescribed factor by which said input signal is attenuated when said preselected level is exceeded.

7. An integrator comprising:

a voltage to frequency transducer having a limited range over which the frequency of the impulses developed by said transducer is linearly related to the amplitude of a signal supplied thereto;

means for supplying an input signal to said voltage to frequency transducer;

a counter for counting the impulses developed by said voltage to frequency transducer;

sensing means for monitoring the output frequency of said voltage to frequency transducer is operating;

means responsive to said sensing means for attenuating said input signal by a prescribed factor when a preselected output frequency of said transducer is exceeded and for translating said attenuated signal to said voltage to frequency transducer and for discontinuing attenuation of said input signal by said prescribed factor when the operation of said transducer drops below said preselected output frequency;

and means responsive to said sensing means for increasing the counting rate of said counter by the same prescribed factor by which said input signal is attenuated when said preselected output frequency is exceeded and for resuming the initial counting rate of said counter when the operation of said transducer drops below said preselected output frequency.

8. An integrator comprising:

a voltage to frequency transducer having a limited range over which the frequency of the impulses developed by said transducer is linearly related to the amplitude of a signal supplied thereto;

means for supplying an input signal to said voltage to frequency transducer;

a counter for counting the impulses developed by said voltage to frequency transducer;

a bi-stable circuit responsive to said impulses developed by said voltage to frequency transducer for developing a pair of oppositely phased rectangular signals of half the frequency of said impulses, the durations of said rectangular signals varying inversely with the frequency of said impulses;

a first differentiating circuit responsive to a first of said rectangular signals for differentiating said first rectangular signal and thereby developing a first overshoot from the trailing edge of said first rectangular signal, the amplitude of said first overshoot varying directly with the duration of said first rectangular signal;

first clipping means for removing said first overshoot;

a second differentiating circuit, having a fast time constant, responsive to the output signal of said first clipping means for differentiating said output signal and thereby developing a second overshoot from the trailing edge of said output signal, the amplitude of said second overshoot varying directly with the amplitude of said trailing edge of said output signal;

a third differentiating circuit responsive to the second of said rectangular signals for differentiating said second rectangular signal and thereby developing a third overshoot from the trailing edge of said second rectangular signal, the amplitude of said third overshoot varying directly with the duration of said second rectangular signal;

means responsive to said second overshoot for developing a first control effect when the amplitude of said second overshoot exceeds a first preselected level;

means responsive to said third overshoot for developing a second control effect when the amplitude of said third overshoot exceeds a second preselected level;

means responsive to said first control effect for attenuating said input signal by a prescribed factor when said first preselected level is exceeded and for translating said attenuated signal to said voltage to frequency transducer;

means responsive to said first control effect for increasing the counting rate of said counter by the same prescribed factor by which said input signal is attenuated when said first preselected level is exceeded;

means responsive to said second control effect for discontinuing attenuation of said input signal by said prescribed factor when the amplitude of said third overshoot exceeds said second preselected level;

and means responsive to said second control effect for resuming the initial counting rate of said counter when the amplitude of said third overshoot exceeds said second preselected level.

References Cited by the Examiner

UNITED STATES PATENTS

| 2,891,725 | 6/1959 | Blumenthal et al | 235—183 |
|---|---|---|---|
| 2,950,052 | 8/1960 | Knox | 235—183 X |
| 3,188,455 | 6/1965 | Quick | 235—183 |
| 3,192,371 | 6/1965 | Brahm | 235—183 |
| 3,230,358 | 1/1966 | Davis et al. | 235—183 |

MALCOLM A. MORRISON, *Primary Examiner.*

I. KESCHNER, *Assistant Examiner.*